United States Patent
Cole

(10) Patent No.: US 7,999,230 B2
(45) Date of Patent: Aug. 16, 2011

(54) TUNABLE DETECTION SYSTEM AND METHOD OF USE

(75) Inventor: Aaron Boyd Cole, Bedford, IN (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/545,908

(22) Filed: Aug. 24, 2009

(65) Prior Publication Data

US 2011/0019185 A1 Jan. 27, 2011

Related U.S. Application Data

(63) Continuation of application No. 12/509,154, filed on Jul. 24, 2009.

(51) Int. Cl.
 G01J 5/00 (2006.01)
 G02B 26/00 (2006.01)

(52) U.S. Cl. .................... 250/338.1; 359/290

(58) Field of Classification Search .......... 250/338.1, 250/458.1, 459.1, 336.1; 356/328; 324/316; 385/12; 359/290
See application file for complete search history.

(56) References Cited

U.S. PATENT DOCUMENTS

| | | | |
|---|---|---|---|
| 3,798,532 A | 3/1974 | Hausser | |
| 3,832,061 A | 8/1974 | Smith et al. | |
| 4,068,125 A | 1/1978 | Bell | |
| 4,952,811 A | 8/1990 | Elliott | |
| 5,340,983 A * | 8/1994 | Deinzer et al. | 250/281 |
| 5,548,217 A | 8/1996 | Gibson et al. | |
| 5,591,981 A * | 1/1997 | Heffelfinger et al. | 250/458.1 |
| 6,485,703 B1 | 11/2002 | Coté et al. | |
| 6,785,433 B2 * | 8/2004 | Tiefenthaler | 385/12 |
| 7,145,124 B2 * | 12/2006 | Garrood et al. | 250/208.1 |
| 7,254,286 B2 | 8/2007 | Kochergin et al. | |
| 7,257,279 B2 | 8/2007 | Guo et al. | |
| 7,417,440 B2 | 8/2008 | Peschmann et al. | |
| 7,671,687 B2 * | 3/2010 | LeChevalier | 330/308 |
| 2003/0053051 A1 | 3/2003 | Blais | |
| 2006/0146324 A1 | 7/2006 | Klein | |
| 2007/0228503 A1 | 10/2007 | Yokoyama | |
| 2008/0217542 A1 * | 9/2008 | Verma et al. | 250/370.01 |
| 2008/0290287 A1 | 11/2008 | David | |

OTHER PUBLICATIONS

Lippmann, "Index of refraction of a free-electron-laser beam," The American Physical Society, 1986, vol. 34, No. 1, pp. 638, 639.
"See-through scanner sets off alarms," Mar. 18, 2002, http://archives.cnn.com/2002/TRAVEL/NEWS/03/18/rec.airport.xray/2/7/2009.
Rapiscan Systems, "Hands-Off Screening Quick and Effective Privacy Protection High Resolution Imaging," Mar. 2008, 2 pgs.
Rapiscan Systems, "Hands-Off Screening Quick and Effective Privacy Protection High Resolution Imaging," http://www.rapiscansystems.com/sec1000.html2/7/2009, 2 pgs.
Rapiscan Systems, "Walk-Through Screening Quick and Effective Privacy Protection High Thoughput," 2008, 2 pgs.

* cited by examiner

*Primary Examiner* — David Porta
*Assistant Examiner* — Faye Boosalis
(74) *Attorney, Agent, or Firm* — Christopher A. Monsey

(57) ABSTRACT

A tunable bandwidth selector and method of use is disclosed. The tunable bandwidth selector may include a plurality of spaced apart electron sheets which selectively separate a first bandwidth from an input spectrum.

18 Claims, 18 Drawing Sheets

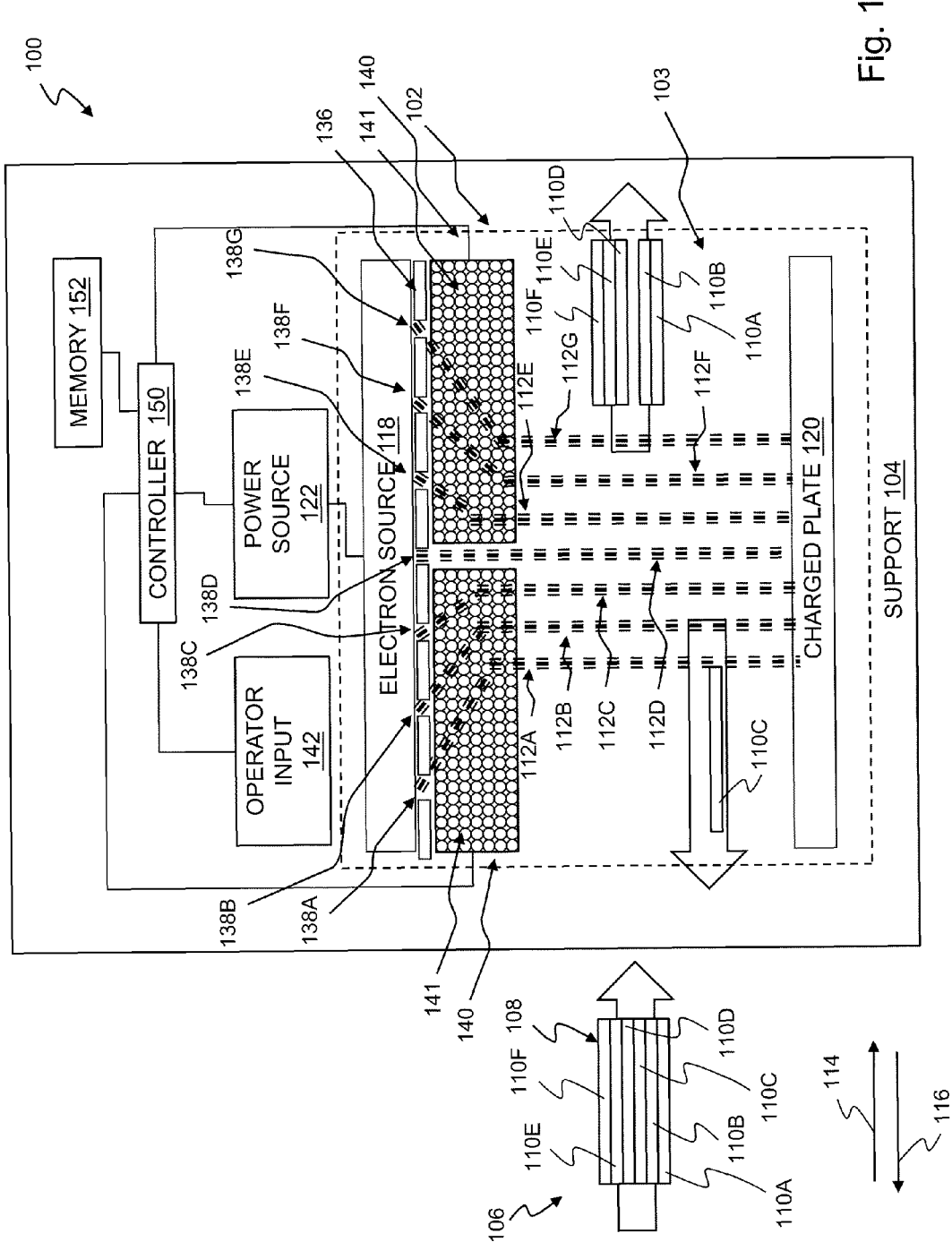

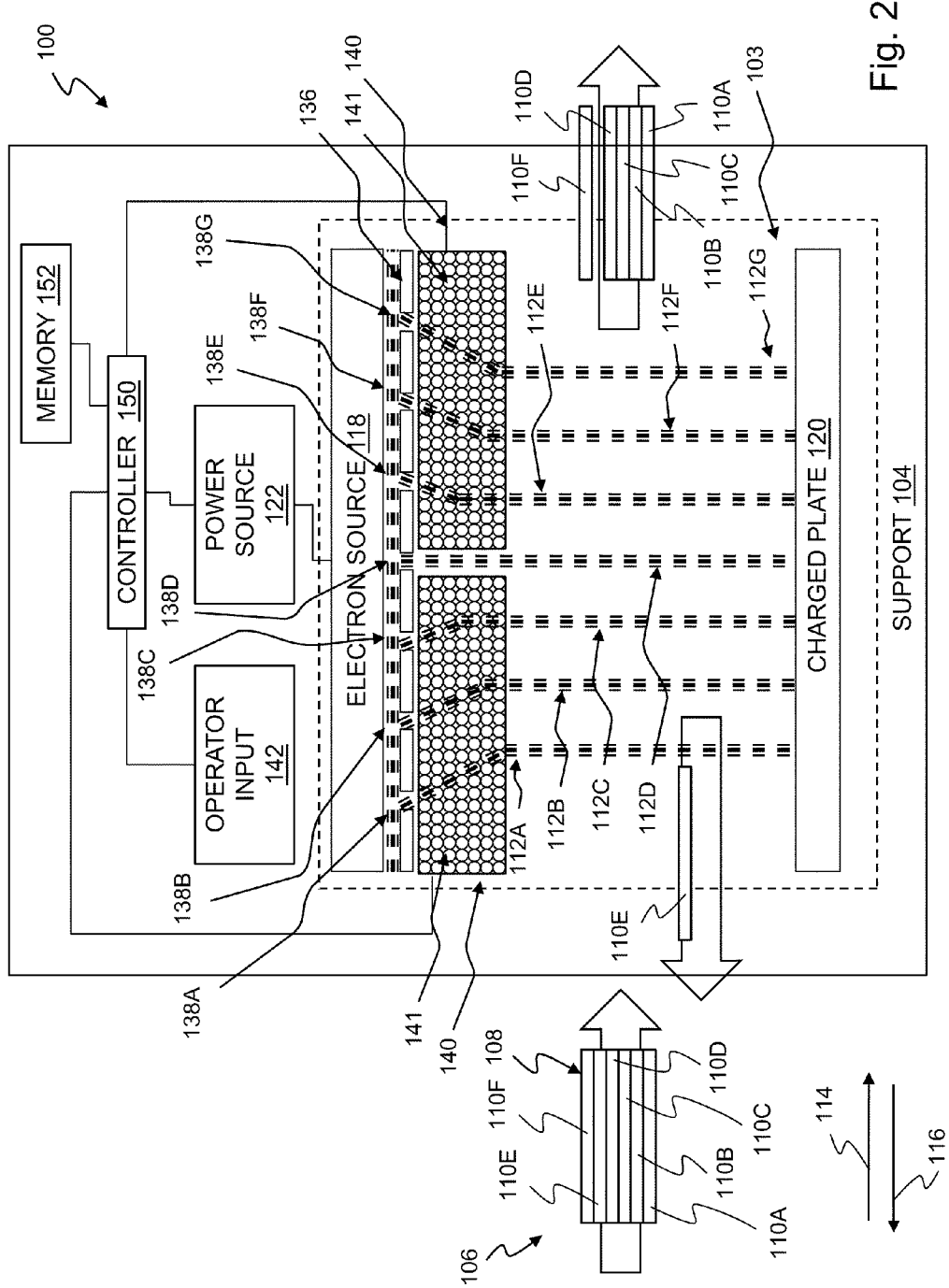

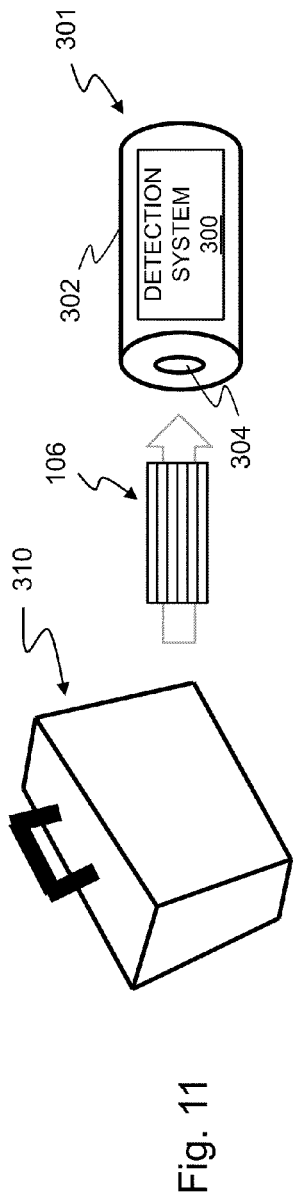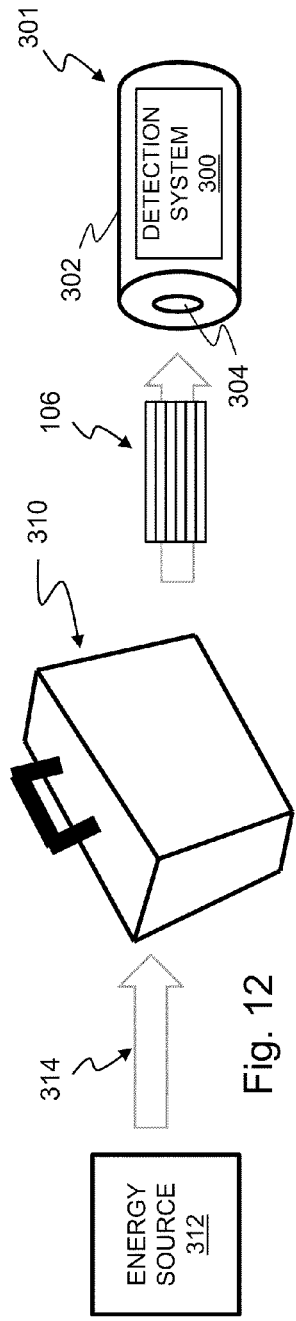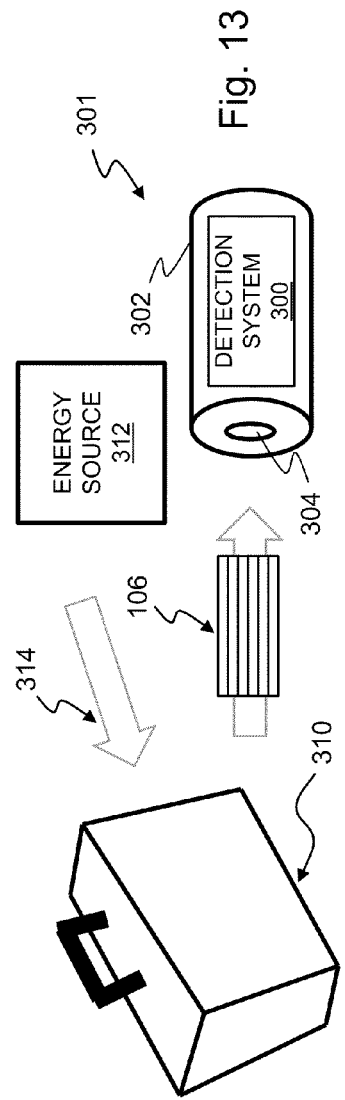

TUNABLE DETECTION SYSTEM AND METHOD OF USE

CROSS-REFERENCE TO RELATED APPLICATION

This application is a continuation of U.S. patent application Ser. No. 12/509,154, filed Jul. 24, 2009, the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to devices for detecting the presence of an object or substance, and, more particularly, to devices for detecting the presence of an object or substance with a tunable detection system.

It is known to use Fiber Bragg gratings to selectively separate a portion of a spectrum from the remainder of the spectrum. In a Fiber Bragg grating a periodic change in index of refraction is provided in the core of the fiber. Based on the indexes of refraction of the core materials and the spacing of the periodic structure a given bandwidth is separated from an input spectrum. Fiber Bragg gratings are useful in communication and sensor applications.

It is desirable to have a non-fiber based tunable detection system which may be used to identify the presence of one or more elements, molecules, chemicals, biological materials, materials, substances, and objects (collectively referred to as "targets") within an ambient environment or as part of a target of interest in a detection zone.

SUMMARY OF THE INVENTION

In an exemplary embodiment of the present disclosure, a tunable bandwidth selector is provided. In one example, the tunable bandwidth selector is non-fiber based. The tunable bandwidth selector may be used as part of a stand off chemical and/or biological agent detection device. The tunable bandwidth selector may be used as part of a hyper-spectral imaging device. The tunable bandwidth selector may be used as part of a screening system. The tunable bandwidth selector may be used in a non-imaging detection or evaluation system. The tunable bandwidth selector may be used in an imaging detection or evaluation system.

In another exemplary embodiment of the present disclosure, a method for separating a first bandwidth from an input spectrum including the first bandwidth is provided. The method comprising: providing a plurality of spaced apart electron sheets; introducing the input spectrum to the plurality of spaced apart electron sheets such that at least a first portion of the input spectrum transverses the plurality of spaced apart electron sheets; and adjusting the plurality of spaced apart electron sheets so that the first bandwidth is separated from the input spectrum.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

FIG. 1 is a representative view of an exemplary tunable detection system tuned to a first bandwidth;

FIG. 2 is a representative view of the exemplary tunable detection system of FIG. 1 being tuned to a second bandwidth;

FIG. 8A is a representative view of an exemplary imaging system;

FIG. 11 is a representative view of a portable detection system which is monitoring a piece of luggage in a detection zone;

FIG. 12 is a representative view of the portable detection system of FIG. 11 wherein the luggage is radiated by an energy source located opposite of the portable detection system;

FIG. 13 is a representative view of the portable detection system of FIG. 11 wherein the luggage is radiated by an energy source located generally on the same side of the luggage as the portable detection system;

Figure 1A:
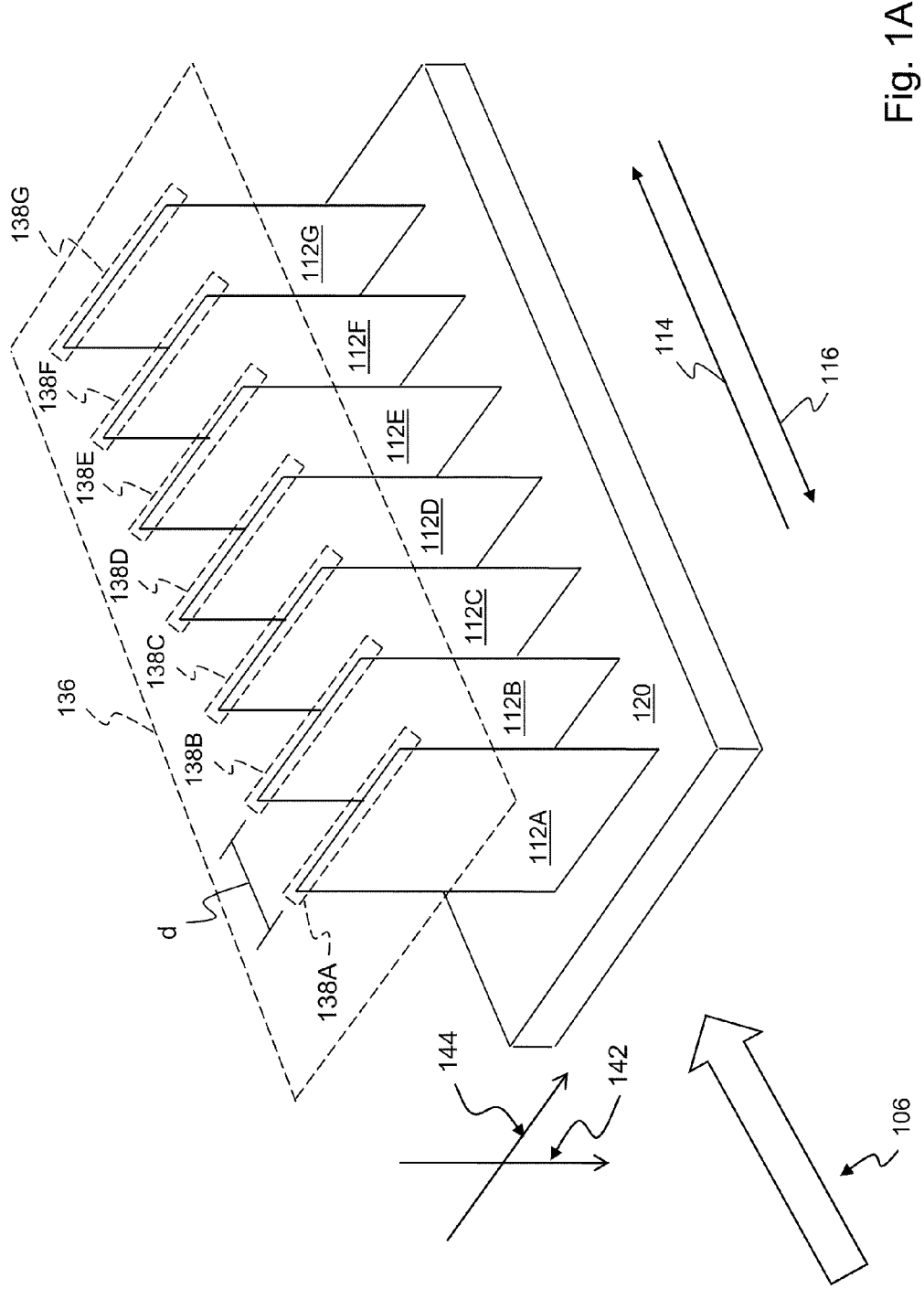
FIG. 1A is a representative view of a portion of the exemplary tunable detection system of FIG. 1.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring to FIG. 1, a tunable detection system 100 is shown. Detection system 100 includes a tunable bandwidth selector 102 which is supported on a support 104. Support 104 may be any suitable type of support and may include a frame for securing the components of tunable bandwidth selector 102 and a housing for enclosing tunable bandwidth selector 102. In one embodiment, support provides a sealed cavity including the tunable bandwidth selector 102. The sealed cavity may define a vacuum medium 103. The sealed cavity may include other types of medium 103, such as a gas and other suitable mediums.

Tunable bandwidth selector 102 receives electromagnetic radiation 106 which includes a plurality of different wavelengths generally referred to herein as an input spectrum 108. For illustration of the operation of tunable bandwidth selector 102, input spectrum 108 is represented as having six bandwidths 110A-110F. Each of bandwidths 110A-F may be comprised of a single wavelength or a plurality of wavelengths. Of course input spectrum 108 may be composed of numerous bandwidths spanning various traditional spectral bands including white light, ultraviolet, infrared, and other spectral bands.

Tunable bandwidth selector 102 functions to separate a first bandwidth from the remainder of input spectrum 108, if the first bandwidth is present in input spectrum 108. In one embodiment, the first bandwidth is a spectrum centered on a specific wavelength. In one embodiment, the first bandwidth is a single wavelength.

Referring to FIG. 1, tunable bandwidth selector 102 includes a plurality of spaced apart electron sheets 112A-G. Electromagnetic radiation 106 moves generally in direction 114 such that input spectrum 108 encounters electron sheets 112. Each of electron sheets 112 is comprised of a plurality of electrons which are provided by an electron source 118 and are traveling towards a charged plate 120. An exemplary electron source is a heated filament which is heated by a power supply 122. An exemplary power supply is a high voltage DC source. In one example, the high voltage DC source may be modulated between zero volts and a first voltage. The first voltage should be of a value to create the electron sheets 112. In one example, the first voltage is high enough to create the electron sheets and to vary the electron density of the electron sheets. In one embodiment, a variable AC source may be used to produce a modulated waveform. In one embodiment, one or more function generators may be used to produce a modulated density in the electron sheets 112. A variation in the density of an electron sheet 112 changes the index of refraction of the electron sheet 112.

The plurality of electron sheets 112 are spaced apart from adjacent electron sheets 112. In one embodiment, the spacing of electron sheets 112 is constant. In one embodiment, the spacing of electron sheets 112 is constant between adjacent sheets, but differs across the collection of electron sheets 112. Although seven electron sheets 112 are shown tunable bandwidth selector 102 may include less electron sheets 112 or more electron sheets 112. In one embodiment, electron sheets 112 are generally planar sheets. In one embodiment, electron sheets 112 are generally cylindrical sheets. Additionally the cylindrical electron sheets can be of a fixed radius of curvature, a variable radius of curvature, or have an elliptical curvature where the radius varies as a function of position.

Each of electron sheets 112 pass through a medium 103 in the region wherein electron sheets 112 are provided. Medium 103 has a first index of refraction, $n_1$. Electron sheets 112 have a second index of refraction $n_2$ which differs from $n_1$. As electromagnetic radiation 106 moves in direction 114, the difference in index of refraction between electron sheets 112 and medium 103 and the spacing of electron sheets 112 causes a first bandwidth of input spectrum 108 to be generally separated from the remainder of input spectrum 108. The first bandwidth is generally reflected by tunable bandwidth selector 102 and the remainder of input spectrum 108 is generally passed by tunable bandwidth selector 102.

A central wavelength of the first bandwidth is provided by the relationship in equation 1

$$\lambda_{fb} = (n_1 + n_2)d \tag{1}$$

wherein $\lambda_{fb}$ is the central wavelength, $n_1$ is the index of refraction of medium 103, $n_2$ is the index of refraction of electron sheets 112, and d is the spacing of electron sheets 112. The first bandwidth is provided by the relationship in equation 2

$$\Delta\lambda = 2(n_2 - n_1)(1/\pi)\lambda_{fb} \tag{2}$$

wherein $\Delta\lambda$ is the first bandwidth, $\lambda_{fb}$ is the central wavelength, $n_1$ is the index of refraction of medium 130, $n_2$ is the index of refraction of electron sheets 112, and $\pi$ is a constant.

As provided by equations 1 and 2, the first bandwidth separated by tunable bandwidth selector 102 may be adjusted by adjusting various parameters including the index of refraction of medium 103, the index of refraction of electron sheets 112, a spacing of electron sheets 112, and combinations thereof.

The index of refraction of medium 103 may be adjusted by changing the medium of medium 103. In one embodiment, the index of refraction of medium 103 may be adjusted by changing a temperature of the medium of medium 103.

The index of refraction of electron sheets 112 may be adjusted by changing a density of electrons in electron sheets 112. The density of the electron sheets is dependent upon the temperature of the electron emitting filament, the dimensions of the output aperture which establishes the geometry of the electron plane, the potential difference establishing the electron plane, the medium into which the electron planes are injected, the distance the electron plane travels, and the energy of the electron plane. In one embodiment the density of electron sheets 112 may be changed by kilo electron Volts for one particular set of index of refraction and by mega electron volts for other particular variations for a required range of indexes of refraction. In one embodiment the index of refraction of electron sheets 112 may be determined by the relationship of equation 3

$$n = 1 + \frac{\lambda_0 + \beta|A|^2}{k_s} \quad (3)$$

wherein n is effective index of refraction, 1 is the index of refraction resultant from being in a vacuum, $\lambda_0$ is the fundamental wavelength, $\beta$ is the radiation field modifier which is a function of wave-number and variations in the energy of the electron beam, A is the amplitude of the radiation field, and $k_s$ is the wave-number of the radiation field. In another embodiment where the electron sheets are produced by a plasma or result in the creation of a plasma the index of refraction of electron sheets 112 may be determined by the relationship of equation 4

$$n = \sqrt{1 - \frac{N_{elec}}{N_{crit}}} \quad (4)$$

wherein n is effective index of refraction, $N_{elec}$ is the electron density of the plasma, and $N_{crit}$ is the plasma critical density.

The spacing of electron sheets 112 may be changed by adjusting the relative location of electron sheets 112. Referring to FIG. 1, electron sheets 112 are generated by electrons provided by electron source 118 traveling towards charged plate 120. These electrons are formed into electron sheets 112 as they pass through openings 138, such as rectangular slits, in a charged filter plate 136 and extend through a detection area including medium 103 (in this case a vacuum) to charged plate 120 as represented in FIG. 1A. FIG. 1A illustrates the initial spacing of the electron sheets 112 (without the influence of magnetic field 140). The initial spacing of electron sheets 112 is set by the spacing of the openings 138 wherein the electron sheets 112 travel straight down to charged plate 120.

Figure 20:
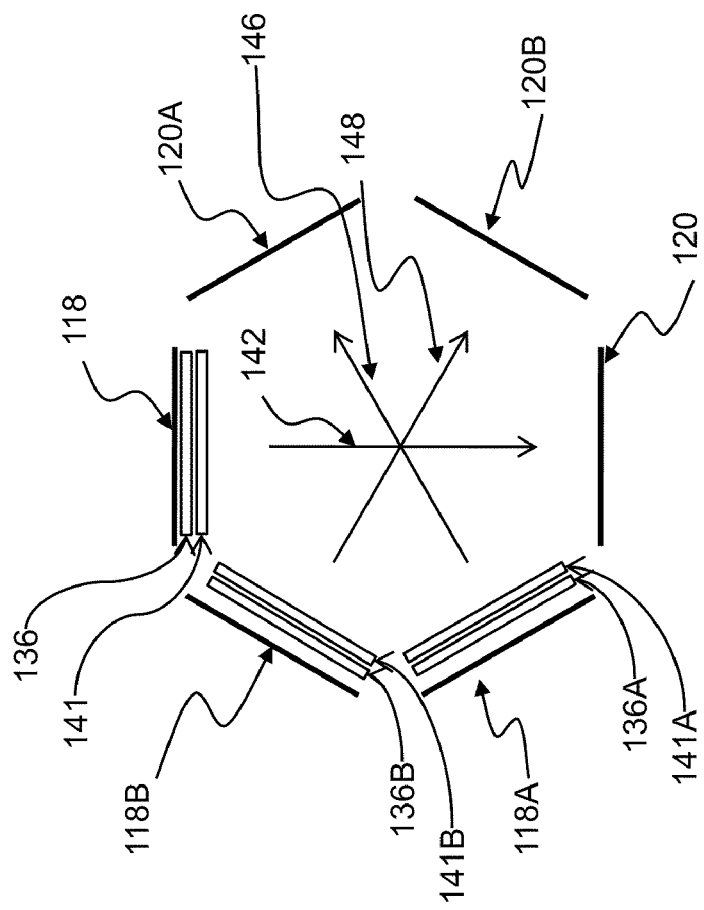
FIG. 20 illustrates an arrangement to provide interlaced electron sheets.
Figure 19:
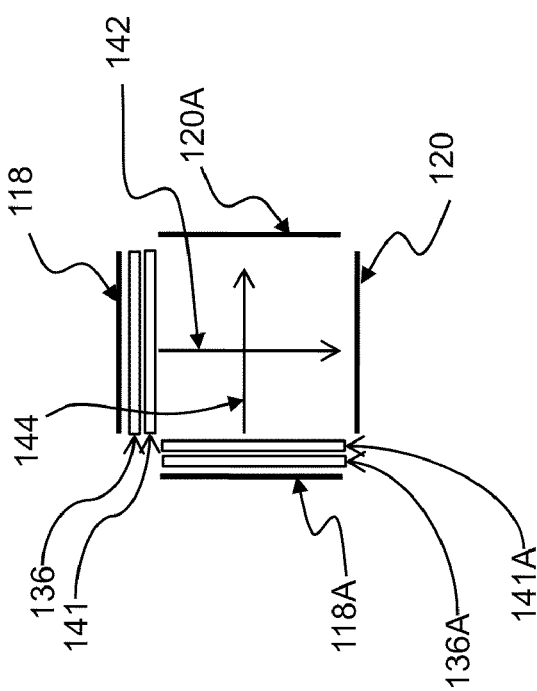
FIG. 19 illustrates an arrangement to provide interlaced electron sheets.

In addition to the electron sheets 112 shown in FIG. 1A, additional sets of electron sheets 112 may be generated by additional sets of electron sources 118 and charged plates 120. Referring to FIG. 19, electron source 118 is represented with electrons traveling in direction 142 (also shown in FIG. 1A) towards charged plate 120. An additional electron source 118A and charged plate 120A are also provided (along with charged plate 136A and devices 141A which produce a magnetic field to alter the spacing of the electron sheets produced by the combination of electron source 118A and charged plates 136A and 120A). Electrons travel in direction 144 (also shown in FIG. 1A) from electron source 118A towards charged plate 120A. In one embodiment, this additional set of electron source 118A and charged plate 120A may produce a plurality of spaced apart electron sheets which are interlaced between the electron sheets 122 of electron source 118 and charged plate 120. For example, a first electron sheet corresponding to source 118A may be positioned between electron sheet 112A and 112B and a second electron sheet corresponding to source 118A may be positioned between electron sheet 112B and 112C. Assuming that the electron sheets corresponding to source 118A are equally spaced from the surrounding electron sheets corresponding to source 118, then the spacing between the collective electron sheets is halved. The spacing of all of the electron sheets may be varied based on the methods discussed herein. Referring to FIG. 20, the arrangement of FIG. 19 is further generalized to include a third electron source 118B and a third charged plate 120B which produce a third set of electron sheets (along with charged plate 136B and devices 141B which produce a magnetic field to alter the spacing of the electron sheets produced by the combination of electron source 118B and charged plates 136B and 120B). The electron sheets corresponding to sources 118, 118A, and 118B travel in directions 142, 146, and 148, respectively. The three sets of electron sheets may be interlaced to result in even further narrowing of the spacing between the collective electron sheets. Any number of electron sources and charged plates may be used to provide further narrowing of the spacing of the collective electron sheets.

In one embodiment, a magnetic field 140 may be introduced to alter the spacing of the electron planes 120. By controlling the strength of the magnetic field 140 the spacing of electron sheets 112 may be altered. A plurality of devices 141 are provided to control the overall magnetic field 140 in a localized manner meaning that the field strength of magnetic field 140 may differ at different locations based on the magnetic fields produced by the devices 141 proximate to the respective locations. In one embodiment, a plurality of microelectronic mechanical structures ("MEMS") are provided to control the strength of the magnetic field 140 by controlling their own localized and isolated magnetic fields. Each of the MEMS devices are controlled by controller 150. Thus, controller 150 is able to vary the magnetic field differently relative to different MEMS devices to steer the electron sheets as desired. In one embodiment, individual isolated magnetic cores are provided to control the strength of the magnetic field 140 by controlling their own localized and isolated magnetic fields. In one embodiment, the magnetic cores are selected from either C, U, and I-shaped cores with high permeability to direct magnetic fields. In one embodiment, the magnetic cores are tapered to provide a small cross-section in the area corresponding to the electron beams. In one embodiment, the magnetic cores are laminated to prevent cross-currents or eddy currents. Each of the magnetic cores are controlled by controller 150. Thus, controller 150 is able to vary the magnetic field differently relative to different magnetic cores to steer the electron sheets as desired.

In one embodiment, the strength of magnetic field 140 is controlled by a controller 150 having software provided on a memory 152 accessible by controller 150. As explained herein, controller 150 may alter one or more of the index of refraction of medium 103, the index of refraction of electron sheets 112, a spacing of electron sheets 112, and combinations thereof. As such, tunable bandwidth selector 102 may be tunable to select different bandwidths at different times. In this manner, tunable bandwidth selector 102 may be used to monitor a region for a plurality of different bandwidths. As is known various targets give off characteristic electromagnetic spectrum. As such, with detection system 100 a specific type of target may be detected based on the presence and/or the magnitude of the various wavelengths that are monitored. Examples include chemical monitoring, biological monitoring, airport security systems, chemical and biological agent detection, explosives detection, spectral imaging, scanning system, and any other applications whereby an investigator is attempting to identify the presence of a target.

In one embodiment, the tuning of tunable bandwidth selector 102 to a specific bandwidth may be provided through an operator input 142. Exemplary operator inputs include buttons, switches, dials, a touch screen, a graphical user interface, and a file providing the bandwidths for tuning.

Referring to FIG. 1, the index of refraction of medium 103, the index of refraction of electron sheets 112, and a spacing of electron sheets 112 are selected to separate spectrum 110C from the remainder of input spectrum 108. As shown in FIG. 1, spectrum 110C travels in direction 116 while the remainder of input spectrum 108 continues to travel in direction 114. Referring to FIG. 2, at least the spacing of electron sheets 112 is altered which results in spectrum 110E being selected to be separated from the remainder of input spectrum 108. As shown in FIG. 2, spectrum 110E travels in direction 116 while the remainder of input spectrum 108 continues to travel in direction 114.

The spacing of electron sheets 112 may be altered by changing the localized magnetic field 140. In one embodiment, the spacing of electron sheets 112 may be adjusted from about 0.100 microns to about 20 microns. Each embodiment covers a specific spectral range of interest and the electron plane spacing and index of refraction are appropriately varied to cover the spectral response of the optics, the detector, as well as the spectral bandwidth of interest. In one embodiment, the range of spacing needed requires even larger spacing between electron sheets 112. As shown in equation 1 as the spacing between electron sheets 112 increases, the central wavelength of the first bandwidth also increases.

Figure 3:
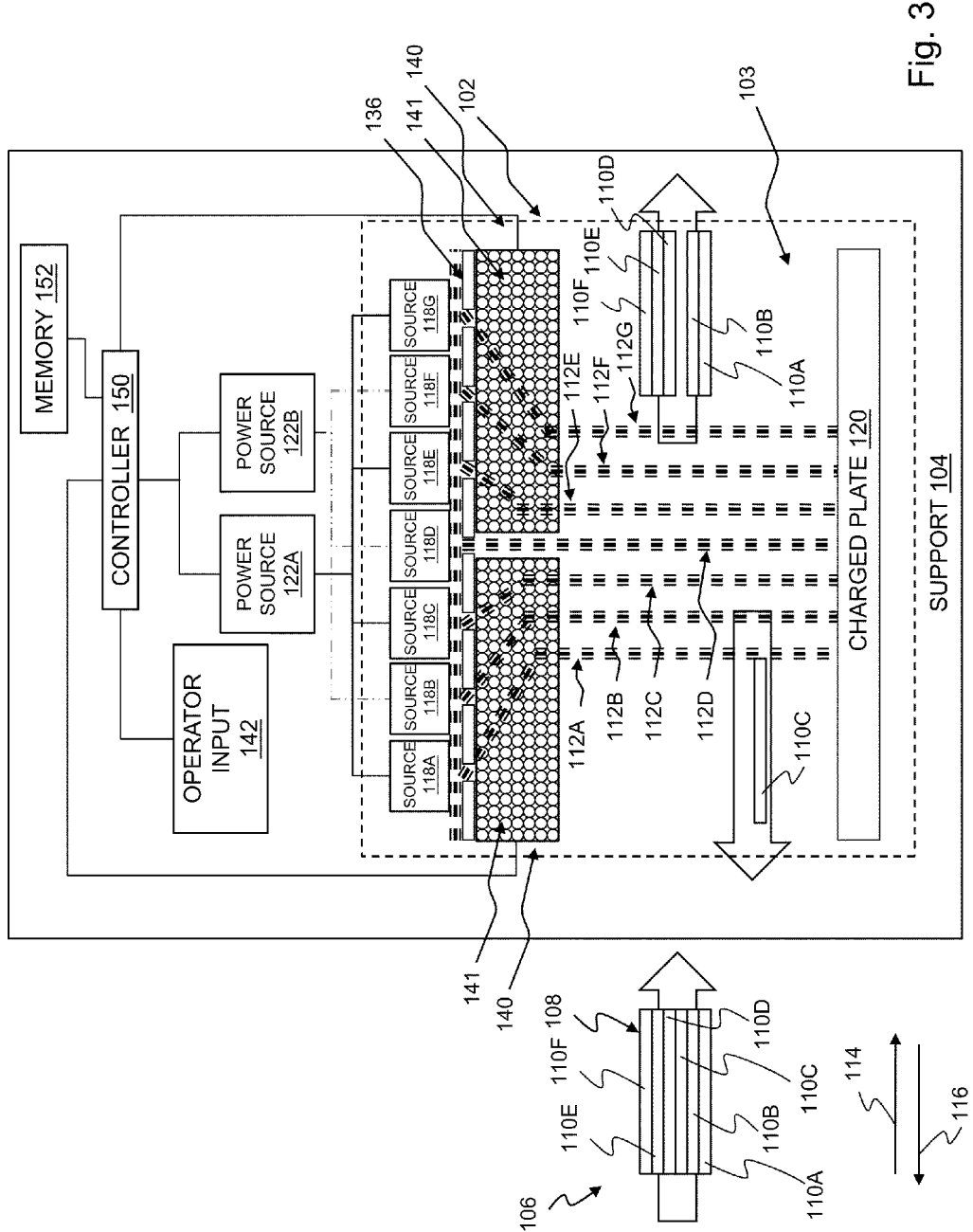
FIG. 3 is a representative view of another exemplary tunable detection system.

Referring to FIG. 3, one embodiment for increasing the separation between adjacent electron sheets 112 is shown. In FIG. 3, a plurality of power supplies 122 are coupled to a plurality of electron sources 118. In the illustrated embodiment, each of openings 138 has a corresponding electron source 118 positioned relative thereto. Further, a series of electron sources 118 are each tied to the same power supply 122. As illustrated, a first power supply 122 provides power to electron sources 118A, 118C, 118E, and 118G and a second power supply 122 provides power to electron sources 118B, 118D, and 118F. One way to increase the spacing between electron sheets 112 is to selectively turn off the power to one of power supply 122A and power supply 122B. This results in the remaining electron sheets 112 having a spacing double of when all of electron sheets 112 are present. Although two power supplies 122 are shown, any number of power supplies having multiple electron source 118 tied thereto may be used.

Figure 4:
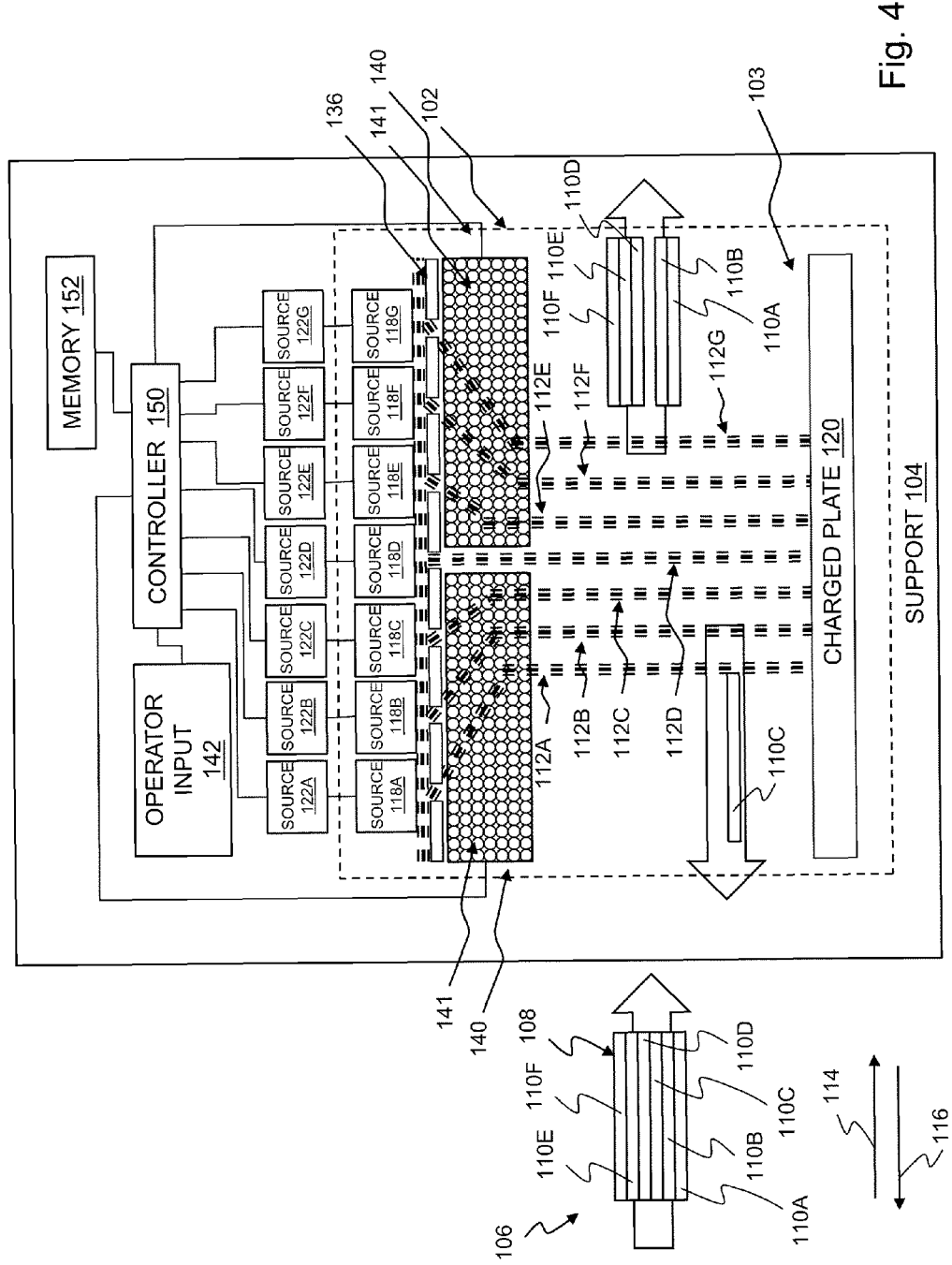
FIG. 4 is a representative view of yet another exemplary tunable detection system.

Referring to FIG. 4, another arrangement for increasing the spacing of electron sheets 112 is shown wherein each of electron sources 118A-G has an independent power supply 122A-G. The spacing between electron sheets 112 may be increased in this arrangement by selectively turning off power to various ones of power supply 122. In one embodiment, the resultant spacing between the remaining electron sheets 112 is constant. In one embodiment, the resultant spacing between the remaining sheets 112 is variable.

In one embodiment, electron sheets 112 are apodized. This reduces the strength of any side lobes (unwanted bandwidth which is directed in direction 116). In an apodized example, the electron sheets 112 towards the ends of the collection of electron sheets 112 are closer in index of refraction to the index of refraction of medium 103, while in the center of the collection of electron sheets 112 the index of refraction is more distinct from the index of refraction of medium 103. In one embodiment, this is accomplished by altering the density of electrons in the respective electron sheets 112. In one embodiment, the change in index of refraction of electron sheets 112 follows a generally Gaussian profile. In one embodiment, the change in index of refraction of electron sheets 112 follows a generally raised-cosine profile.

In one embodiment, the spacing of electron sheets 112 is non-constant resulting in a chirped grating. This has the effect of broadening the range of wavelengths included within the first bandwidth.

As pictured in FIG. 1A, electron sheets 112 are generally normal to the direction of travel, direction 114, of electromagnetic radiation 106. In one embodiment, electron sheets 112 are tilted relative to the direction of travel of electromagnetic radiation 106. This embodiment may change the center wavelength, the effective spectral range of the device, and may move the final incident location of the reflected wavelength.

Figure 5:
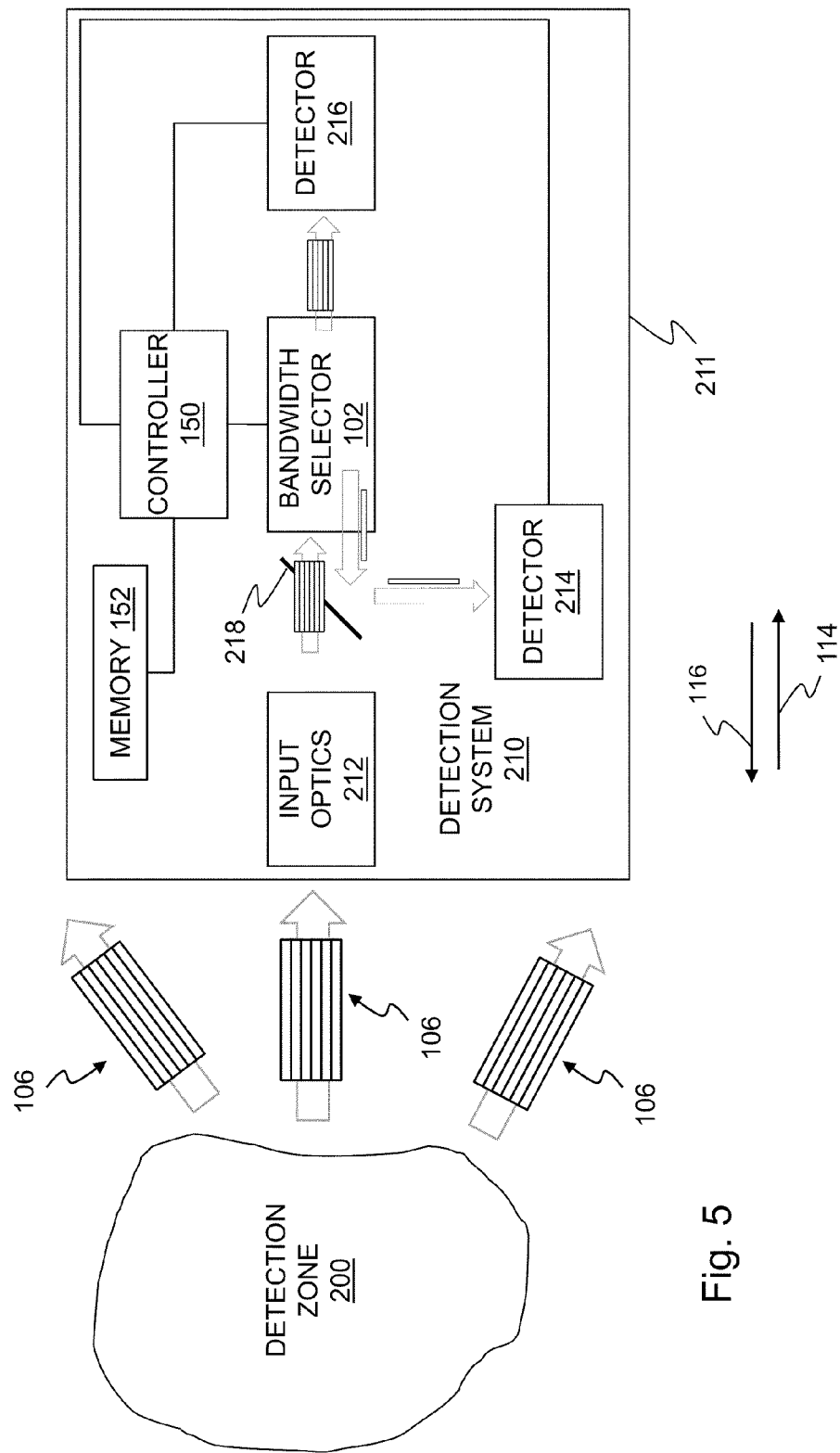
FIG. 5 is a representative view of another is a representative view of yet another exemplary tunable detection system having a plurality of non-imaging detectors.

Referring to FIG. 5, a detection system 210 is shown. Detection system 210 includes one of the arrangements of tunable bandwidth selector 102 shown in FIGS. 1-4 provided in a housing 211. Electromagnetic radiation 106 is introduced into housing 211 through input optics 212. In one embodiment, input optics 212 are simply an optical window. In one embodiment, input optics 212 includes refractive and/or reflective optics having some power to direct electromagnetic radiation 106 towards tunable bandwidth selector 102. In one embodiment, input optics 212 includes filters and/or polarizers to limit the range of electromagnetic radiation 106 entering tunable bandwidth selector 102.

Input optics 212 presents electromagnetic radiation 106 to a notched beamsplitter 218 which passes a portion of electromagnetic radiation 106 onto tunable bandwidth selector 102. As explained herein, tunable bandwidth selector 102 separates a first bandwidth from the remainder of electromagnetic radiation 106. The first bandwidth travels in direction 116 back towards notched beamsplitter 218. Notched beamsplitter 218 redirects a portion of the first bandwidth towards a detector 214. The remainder of the input spectrum travels in direction 114 and passes out of tunable bandwidth selector 102 towards a detector 216. In one embodiment, detector 214 and detector 216 are non-imaging detectors selected for their responsive to the various bandwidths being observed by detection system 210. Exemplary detectors include Si for 0.4 to 0.9 microns, InGaAs for 0.9 to 1.7 microns bandwidth, InSb for 3 to 5 microns bandwidth, vanadium oxide for 8 to 14 microns, and other commercially available detectors to respond to specific commercial applications requiring observation of particular bandwidths, specifically there are detectors coupled with fixed optical filters capable of detecting any bandwidth of interest. In one embodiment, the detector is selected for microwave bandwidths. In one embodiment, detector 214 is a focal plane array which is capable of measuring the power of hyperfine lines in the electromagnetic spectrum reflected by the bandwidth selector 102. In one embodiment, detector 214 is a single detector element which is capable of measuring the power of hyperfine lines in the electromagnetic spectrum reflected by the bandwidth selector 102. In one embodiment, detector 214 is a focal plane array which is capable of measuring the absences of the power of the hyperfine lines in the electromagnetic spectrum not transmitted by the bandwidth selector 102. In one embodiment, detector 214 is a single detector element which is capable of measuring the absence of the power of hyperfine lines in the electromagnetic spectrum not transmitted by the bandwidth selector 102.

Each of detectors 214 and 216 are operatively coupled to controller 150 and provide an indication to controller 150 of the intensity of the first bandwidth (detector 214) and the overall intensity of electromagnetic radiation 106 (detector 216). In one embodiment, detector 216 is positioned opposite detector 214 relative to notched beamsplitter 218 to receive the portion of electromagnetic radiation 106 including the first bandwidth reflected by beamsplitter 218.

Controller 150 based on the intensity level from detector 214 makes a determination of the presence or absence of a specific target corresponding to the first bandwidth tunable bandwidth selector 102 is tuned to separate from electromagnetic radiation 106. In one embodiment, controller 150 compares the intensity level from detector 216 to the intensity level from detector 214 to reduce false positives. In one embodiment, controller 150 compares the intensity level from detector 214 to the previously recorded intensity levels of detector 214 for other wavelengths to reduce false positives. In one embodiment, controller 150 cycles tunable bandwidth selector 102 through various bandwidths to determine the presence or absence of a variety of targets or as confirmation of a single type of target. Some targets have several characteristic bandwidths associated therewith. Further, in a given situation multiple targets may be being scanned for the presence of in an ambient environment or as part of a detection zone.

Figure 6:
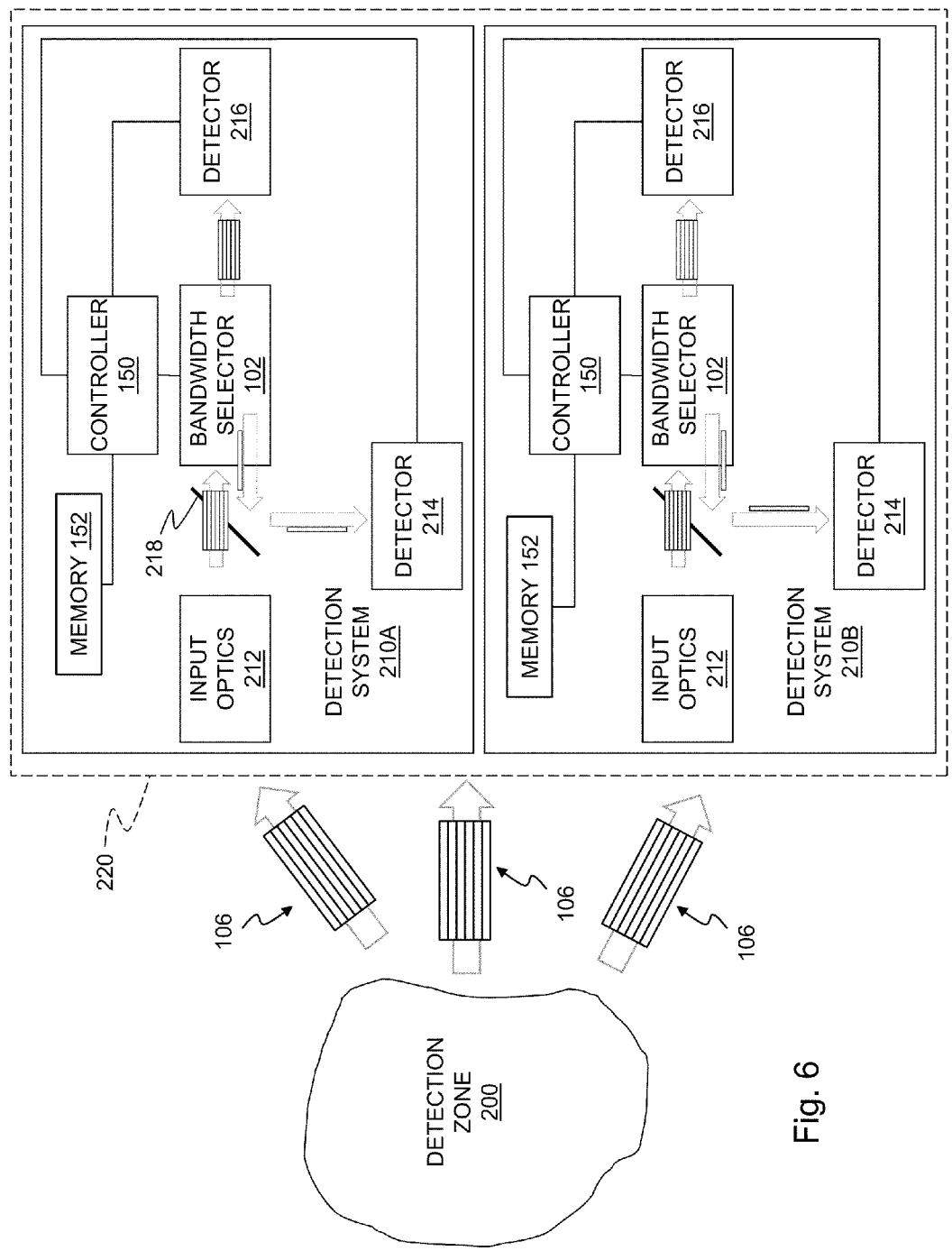
FIG. 6 is a representative view of yet another exemplary tunable detection system having a plurality of non-imaging detectors.

In another embodiment, several detection systems 210 are provided as part of a detection system 220 as shown in FIG. 6. In the embodiment shown in FIG. 6, several individual detection systems 210 are used in concert to detect the presence or absence of various targets. This reduces the range of selection needed for a single tunable bandwidth selector 102. For instance, the tunable bandwidth selector 102 of detection system 210A may be searching for bandwidths within a first bandwidth range while tunable bandwidth selector 102 of detection system 210B may be searching for bandwidths within a second bandwidth range. Although each of detection system 210A and detection system 210B are shown having a separate controller 150 and a separate memory 152, in one embodiment, detection system 210A and detection system 210B share a common controller 150 and memory 152.

Figure 7:
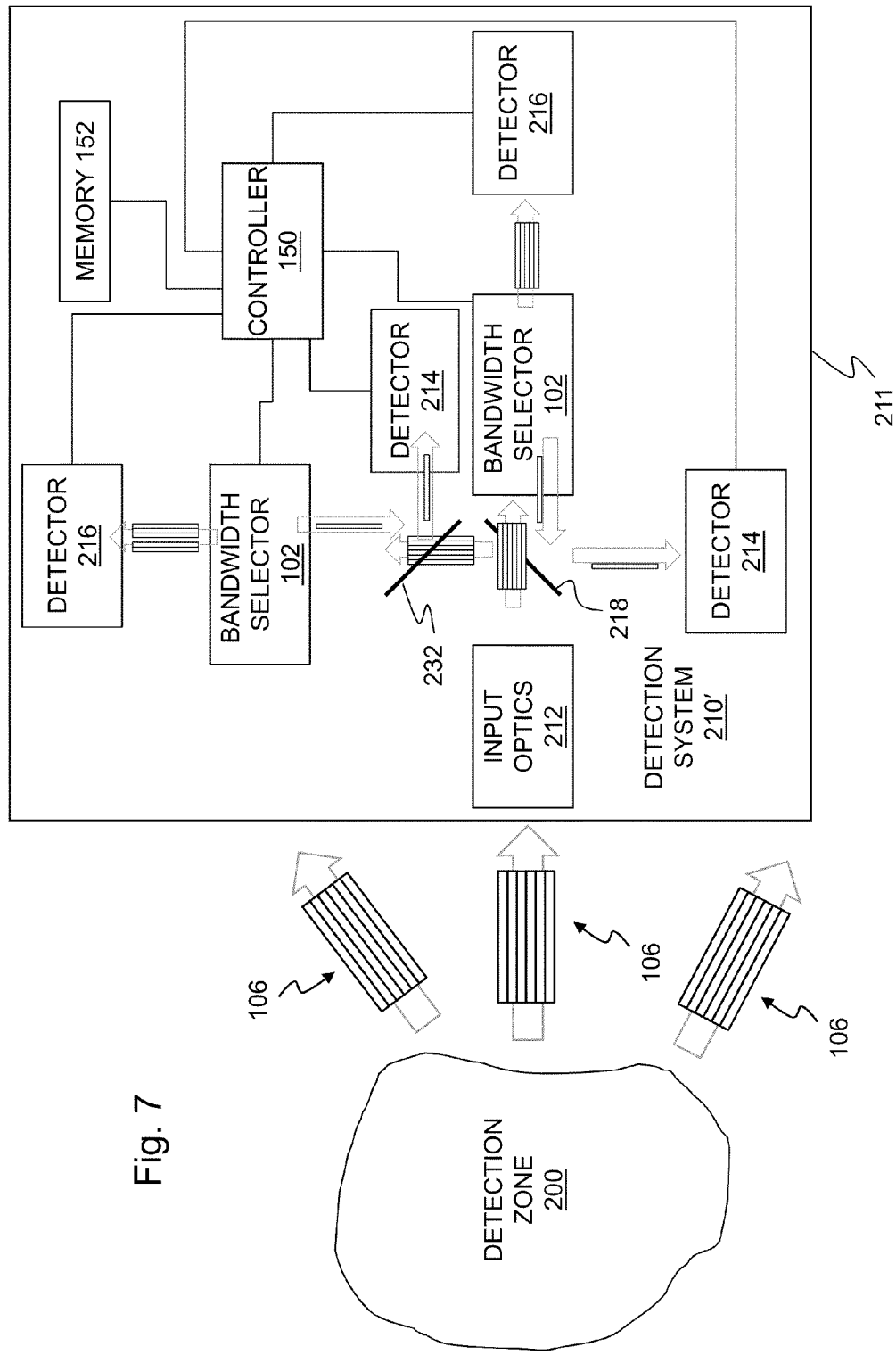
FIG. 7 is a representative view of yet another exemplary tunable detection system having a plurality of non-imaging detectors.

Referring to FIG. 7, another detection system 210' is shown. Detection system 210' is the same as detection system 210, except that a second channel with a second tunable bandwidth selector 102 is added. The second channel interacts with the electromagnetic radiation 106 initially reflected by notched beamsplitter 218. The electromagnetic radiation 106 reflected by notched beamsplitter 218 encounters a second beamsplitter 232 which passes a portion of electromagnetic radiation 106 onto a second tunable bandwidth selector 102. The second tunable bandwidth selector 102 is under the control of controller 150 which tunes tunable bandwidth selector 102 to a desired bandwidth. If the desired bandwidth is present in electromagnetic radiation 106, the desired bandwidth is separated from the remainder of electromagnetic radiation 106 by the second tunable bandwidth selector 102 and is detected by a second detector 214. The remainder of electromagnetic radiation 106 is passed onto detector 216.

It should be noted that controller 150 will take into account the reduced intensity levels associated with the second channel relative to the first channel in determining the presence or absence of a given target.

Figure 9:
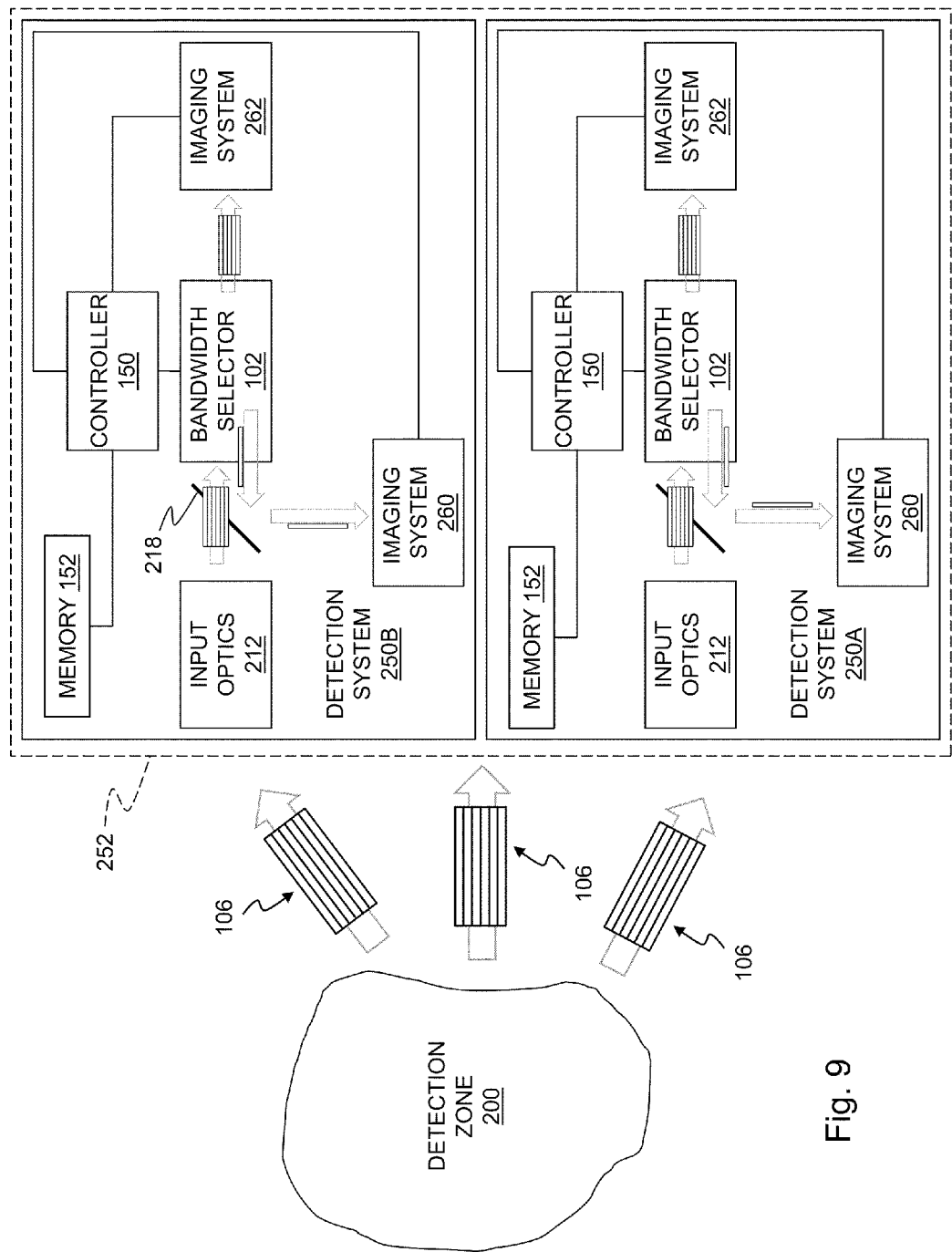
FIG. 9 is a representative view of yet another exemplary tunable detection system having a plurality of imaging systems.
Figure 10:
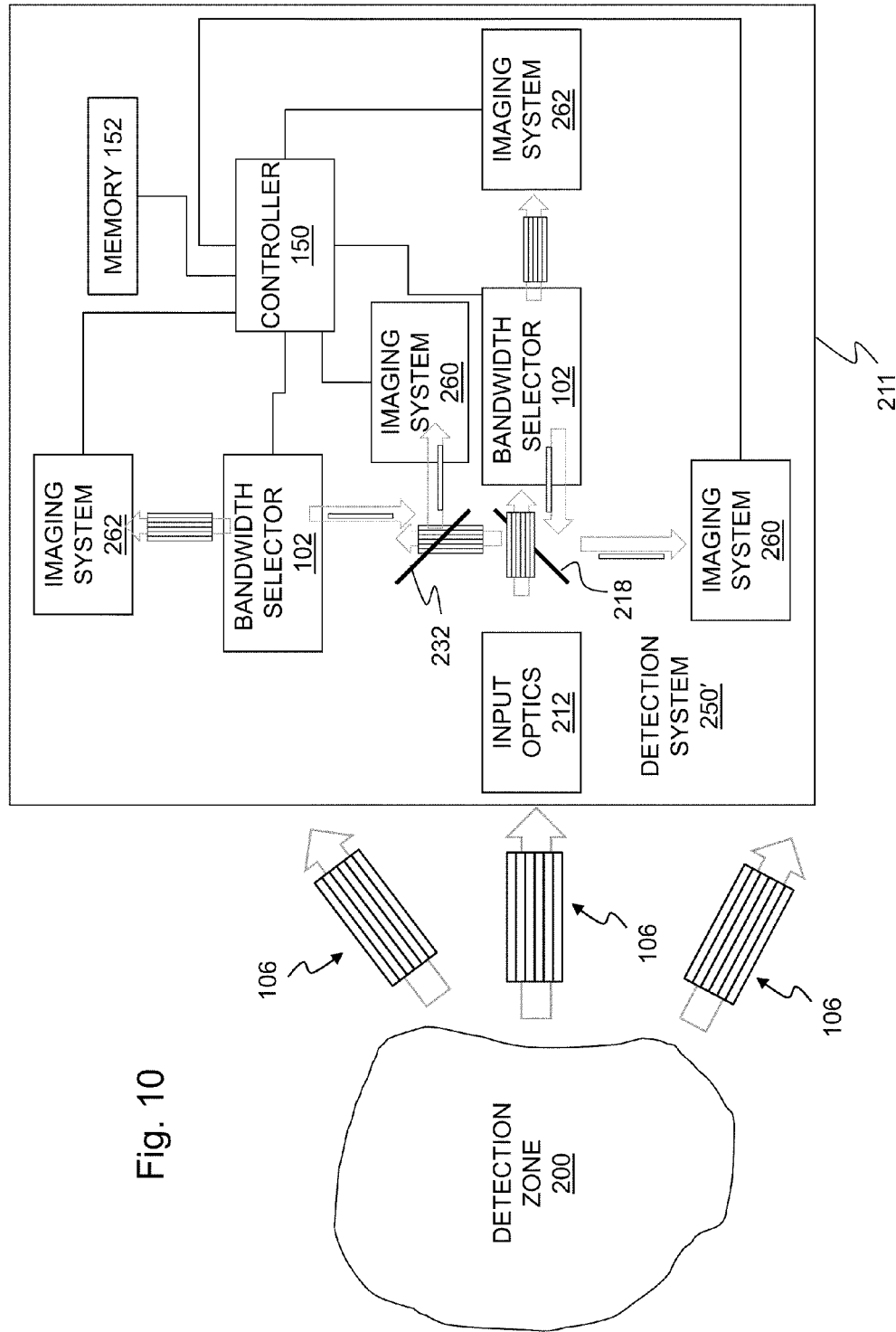
FIG. 10 is a representative view of yet another exemplary tunable detection system having a plurality of imaging systems.

Referring to FIGS. 9-10, three detection systems 250, 252, and 250' are shown. Each of detection systems 250, 252, and 250' are the same as respective detection systems 210, 220, and 210' described herein, except that detectors 214 and 216 are replaced with imaging systems 260 and 262, respectively. Imaging systems 260 and 262 provide an image of the scene of detection zone 200.

Figure 8:
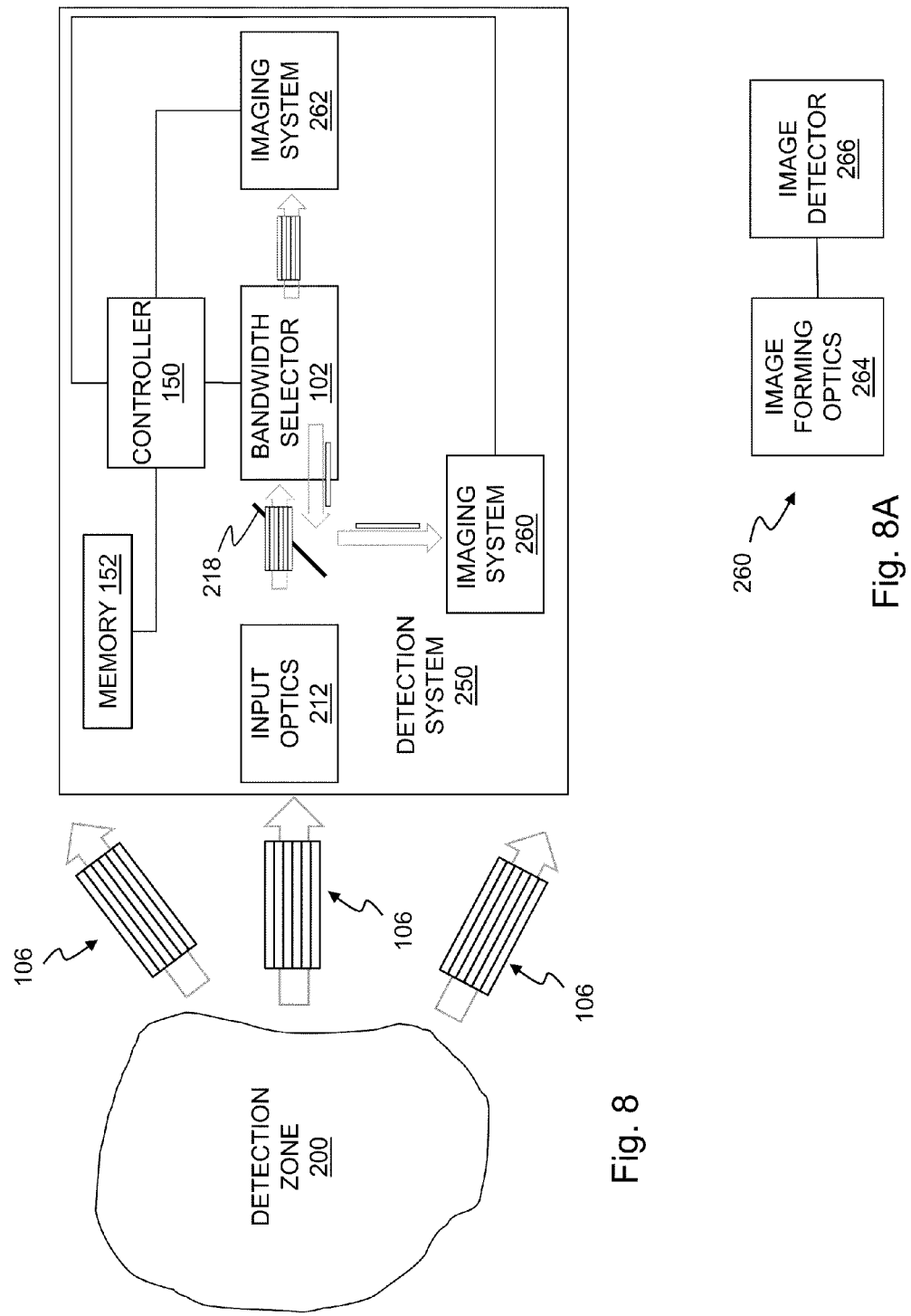
FIG. 8 is a representative view of another is a representative view of yet another exemplary tunable detection system having a plurality of imaging systems.

In one embodiment, as shown in FIG. 8A imaging systems 260 includes image forming optics 264 and an image detector 266. Image forming optics 264 include any suitable optical devices for forming an image of the scene in detection zone 200. In one embodiment, image forming optics 264 includes a zoom feature to focus on various regions of detection zone 200. Exemplary image detectors 266 include charge-coupled devices and any other suitable devices for recording an image of detection zone 200. As explained herein, controller 150 may use imaging systems 260 and 262 together to indicate the location of a detected target.

Referring to FIG. 11, a portable detection device 301 is shown. Portable detection device 301 includes a detection system 300. Detection system 300 may be any of the detection systems disclosed herein. Detection system 300 is provided in a housing 302 having an optical window 304 therein. The portable detection device 301 may take any suitable shape. In one embodiment, portable detection device 301 is shaped like a hand-held device, similar to a rifle or wand, allowing an operator to easily point and aim portable detection device 301.

Portable detection device 301 is shown in conjunction with a piece of luggage 310. Portable detection device 301 examines the electromagnetic radiation 106 provided by luggage 310 to determine the contents of luggage 310 or targets otherwise carried on the surface of the luggage 310. Referring to FIG. 12, in one embodiment, luggage 310 is radiated by electromagnetic radiation 314 provided by an energy source 312. In one embodiment, electromagnetic radiation 314 is selected to excite the emission of a specific first bandwidth if the corresponding target is present in or on the luggage 310. Since energy source 312 is positioned on an opposite side of luggage 310 than portable detection device 301, portable detection device 301 looks at electromagnetic radiation 106 based on the transmission or emission of electromagnetic radiation. Another embodiment is shown in FIG. 13 wherein energy source 312 is positioned on the same side of luggage 310 as portable detection device 301. As such, portable detection device 301 looks at electromagnetic radiation 106 based on the reflectance or emission of electromagnetic radiation from luggage 310.

Figure 14:
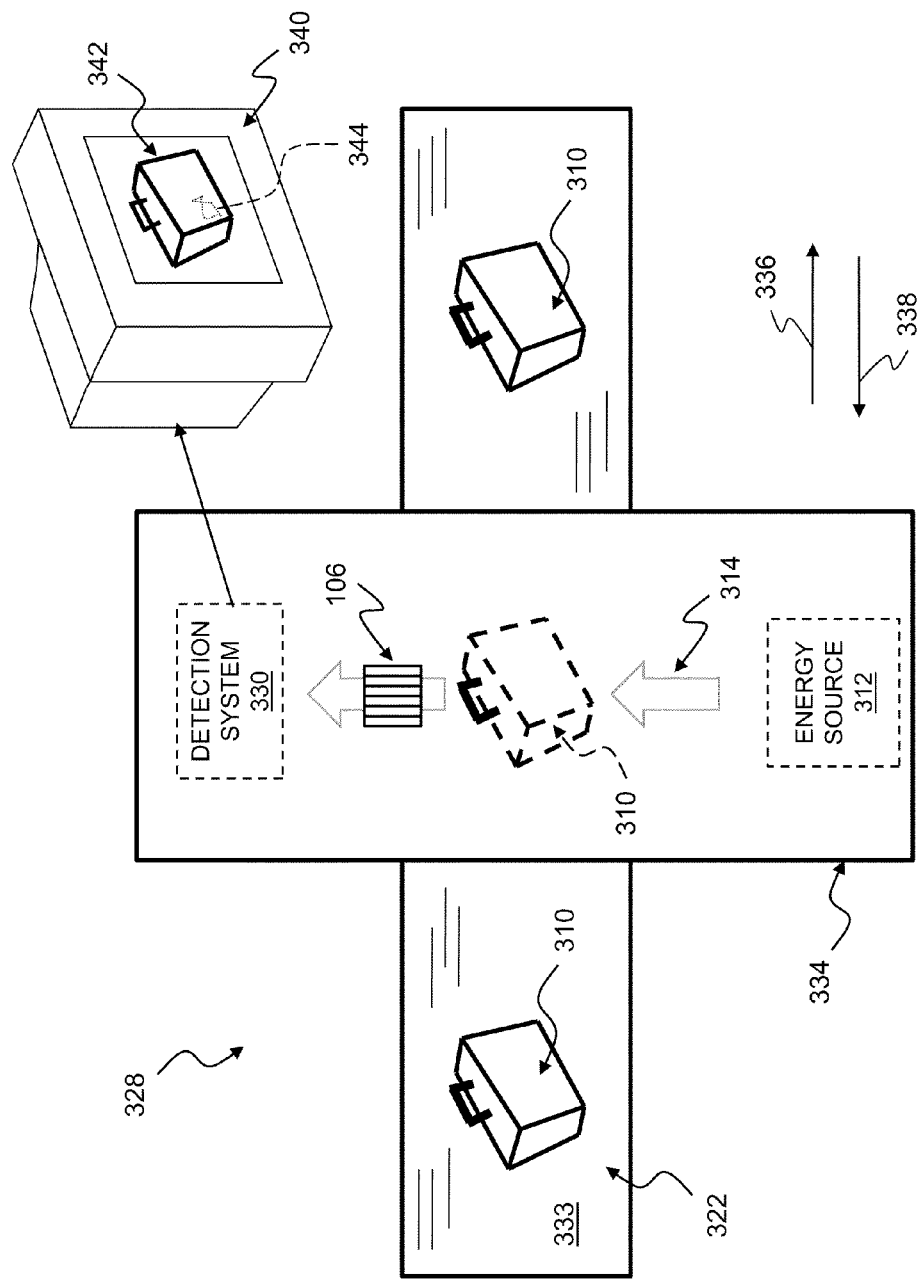
FIG. 14 is a representative view of a luggage scanning system.

Referring to FIG. 14, a scanning system 328 is shown. Scanning system 328 includes a conveyor system 332 including a transport member 333 moveable in direction 336 and direction 338. Exemplary transport members 333 include belts. As a piece of luggage 310 supported by transport member 333 moves in direction 336 it passes into a housing 334. Inside of housing 334 an energy source 312 radiates luggage 310. Electromagnetic radiation 106 produced by luggage 310 is detected by a detection system 330. Detection system 330 may be any of the detection systems disclosed herein. In one embodiment, detection system 330 is an imaging system. Controller 150 of detection system 330 provides an output signal to a monitor 340.

Figure 15:
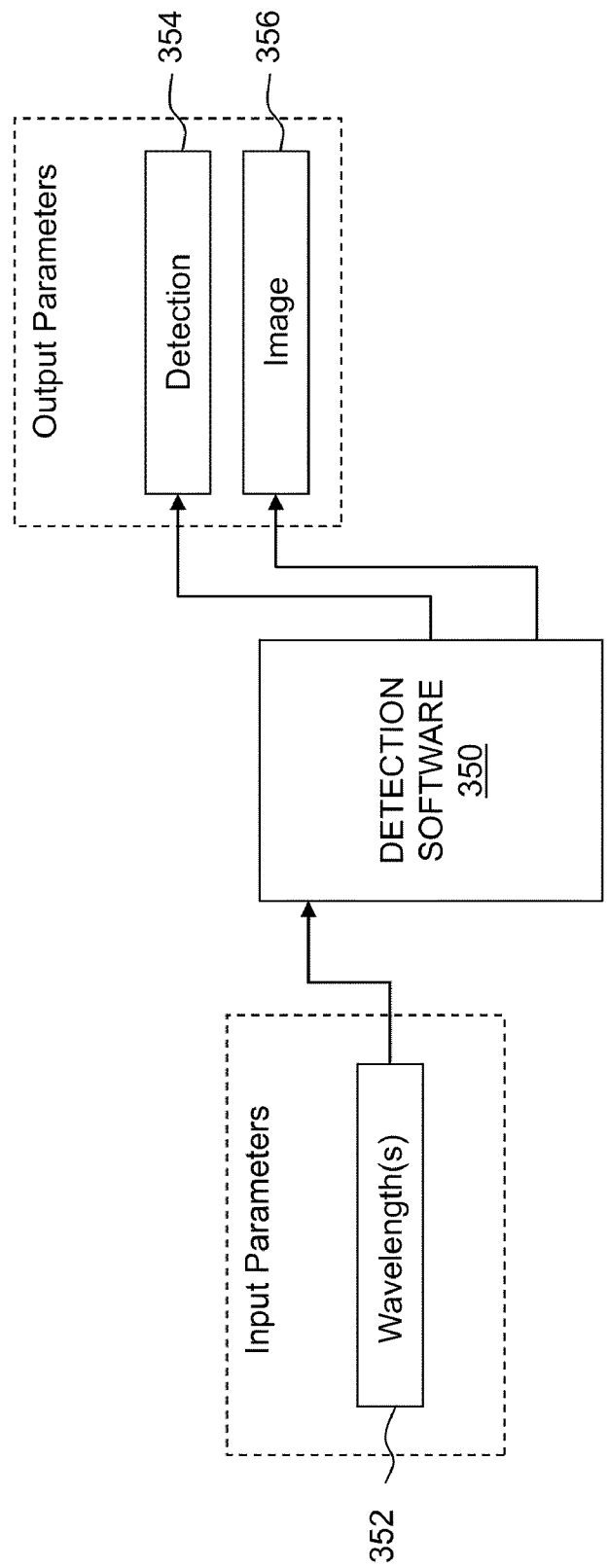
FIG. 15 is a representative view of the information stored on a memory accessible by a controller of any of the preceding detection systems wherein the operator specifies a characteristic of the bandwidth to be detected by the respective detection system.

Referring to FIG. 15, in one embodiment, memory 152 includes detection software 350. In one embodiment, detection software 350 receives an input characteristic 352 of a first bandwidth to detect, illustratively a central wavelength of the first bandwidth. Detection software 350 provides the instructions to controller 150 for setting the tunable bandwidth selector 102 to separate the first bandwidth, if present, from the remainder of input spectrum 108. The instructions may include a spacing of electron sheets 112, a density of electron sheets 112, and an index of refraction of medium 130. Detection software 350 receives from the detectors of the detection system an indication of the amount of first bandwidth present in input spectrum 108. Based on these detected values, detection software 350 provides an output indication of whether the first bandwidth is detected, as represented by detection parameter 354. In the case wherein the detectors are imaging detectors, detection software 350 may provide an image 356 representative of the location of the first bandwidth in the field of view.

Figure 16:
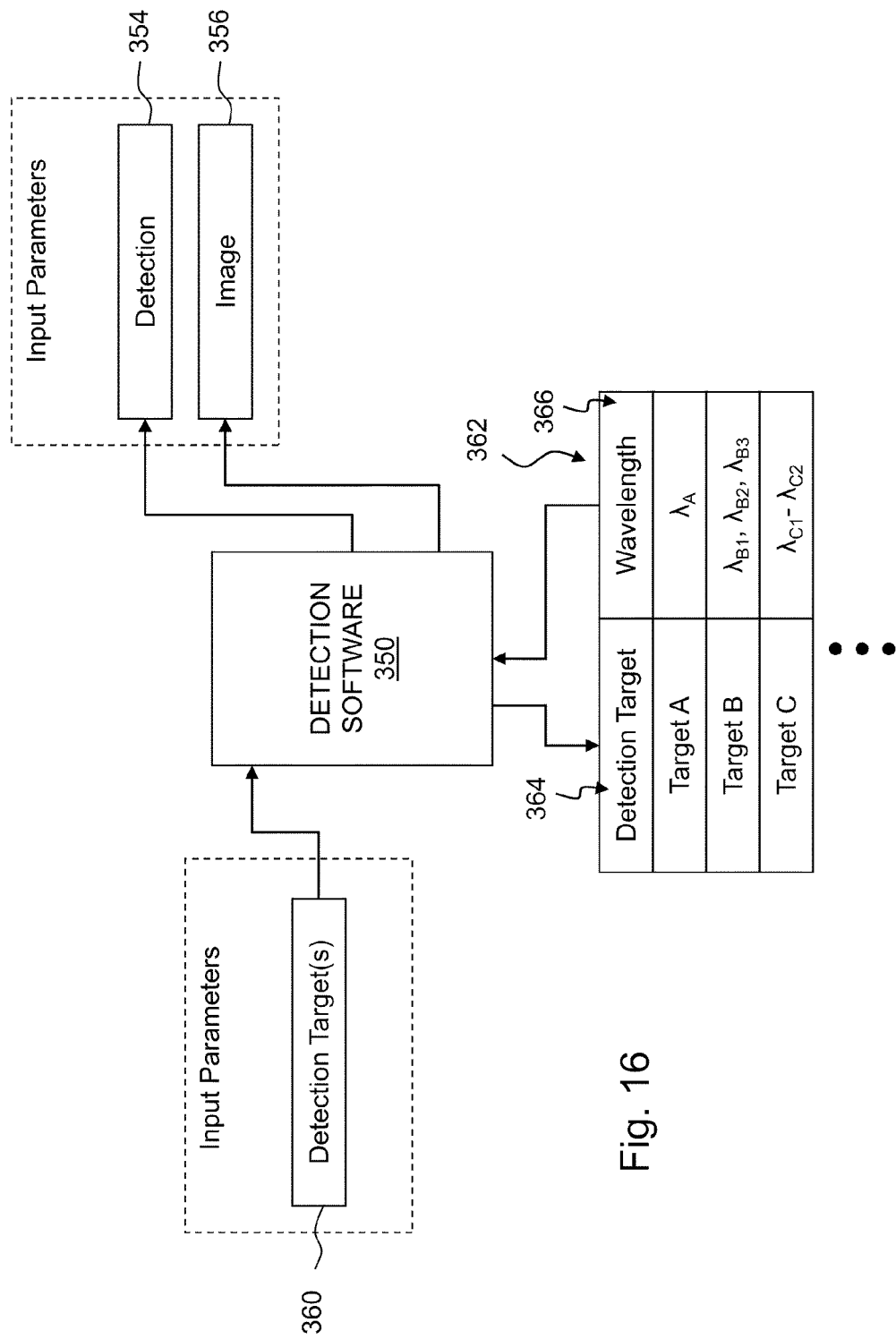
FIG. 16 is a representative view of the information stored on a memory accessible by a controller of any of the preceding detection systems wherein the operator specifies a target to be detected by the respective detection system.

Referring to FIG. 16, instead of receiving an input characteristic 352 detection software 350 receives a specific target to detect as represented by detection target input parameter 360. Detection software 350 then through a database 362 looks up the characteristics 366 of the bandwidths that are representative of the presence of a specified detection target 364. In one embodiment, such as for target A a single first bandwidth is to be examined. In one embodiment, such as for target B a plurality of spaced apart bandwidths are to be examined. In one embodiment, such as for target C a range of first bandwidths are to be examined.

Figure 17:
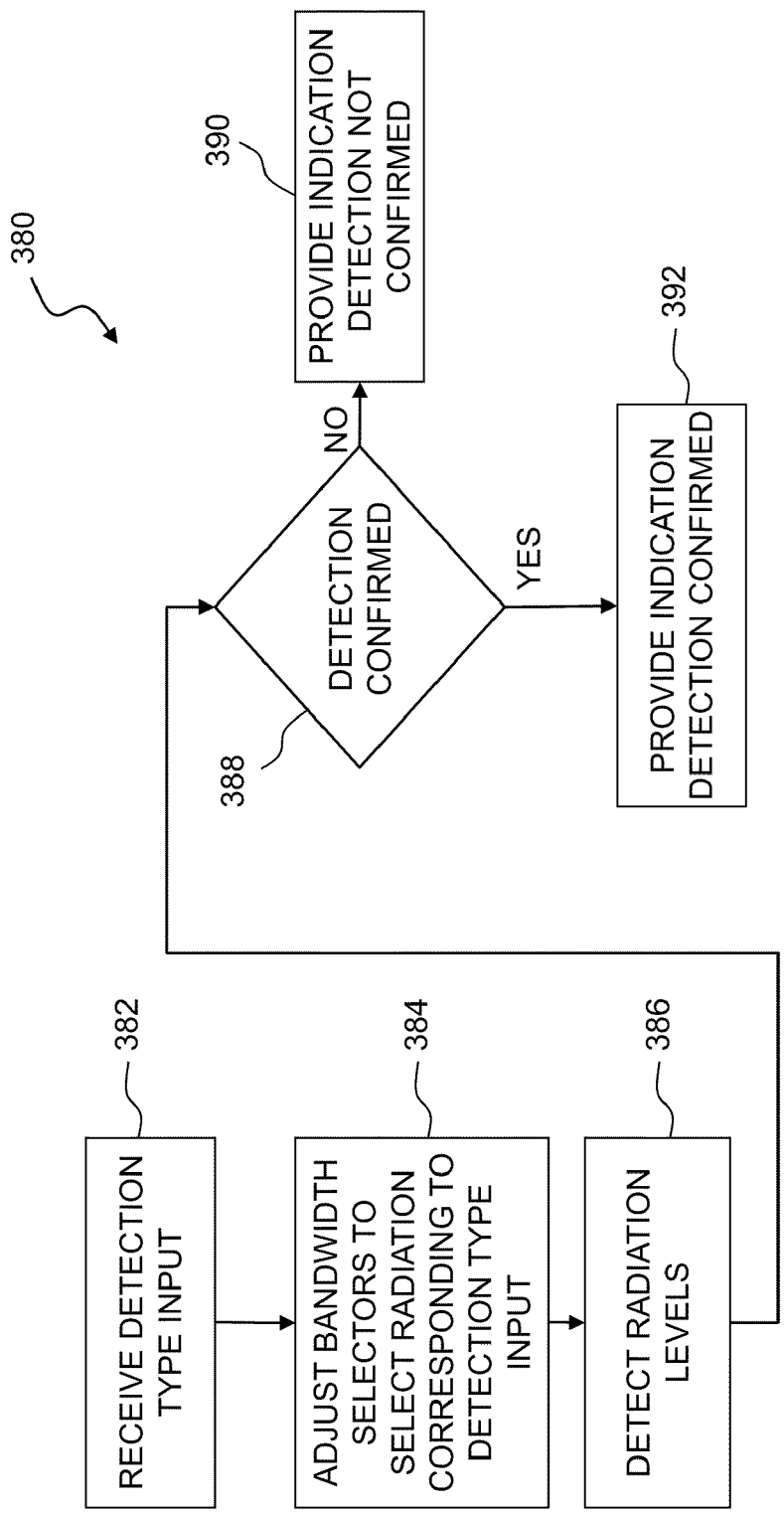
FIG. 17 is a representative processing sequence of the detection software executed by the controller of any of the preceding detection systems.

Referring to FIG. 17 an exemplary processing sequence 380 of detection software 350 is shown. Detection software 350 receives a detection type input, as represented by block 382. In one embodiment, the detection type input is one or more characteristics of one or more bandwidths to be examined. In one embodiment, the detection type input is one or more detection targets to be examined. In either case, a plurality of inputs may be provided in a database or input file and detection software 350 adjusts the respective tunable bandwidth selector 102 sequentially for each input. In this situation, the operation of detection software 350 may automatically cycle through a plurality of inputs. This is useful in setups such as shown in FIG. 14 wherein a plurality of items are sequentially examined in a scanning system.

As mentioned above, based on the input received detection software 350 adjusts the respective tunable bandwidth selector 102 to select a bandwidth corresponding to the current detection type input, as represented by block 384. Detection software 350 then detects the radiation levels with the respective detectors of the detection system, as represented by block 386. Based on the detected levels, detection software 350 determines if a detection of the specific bandwidth is confirmed, as represented by block 388. In one embodiment, detection is confirmed if the detected level exceeds a threshold value.

If detection is not confirmed then detection software 350 provides an indication that the detection is not confirmed, as represented by block 390. The indication may be one of audio, tactile, visual, or a combination thereof. In one embodiment, the indication is simply permitting the continued operation of a system, such as transport member 333 moving in direction 336 in FIG. 14.

If detection is confirmed then detection software 350 provides an indication that the detection is confirmed, as represented by block 392. The indication may be one of audio, tactile, visual, or a combination thereof. In one embodiment, the indication is simply blocking the continued operation of a system, such as transport member 333 moving in direction 336 in FIG. 14.

Figure 18:
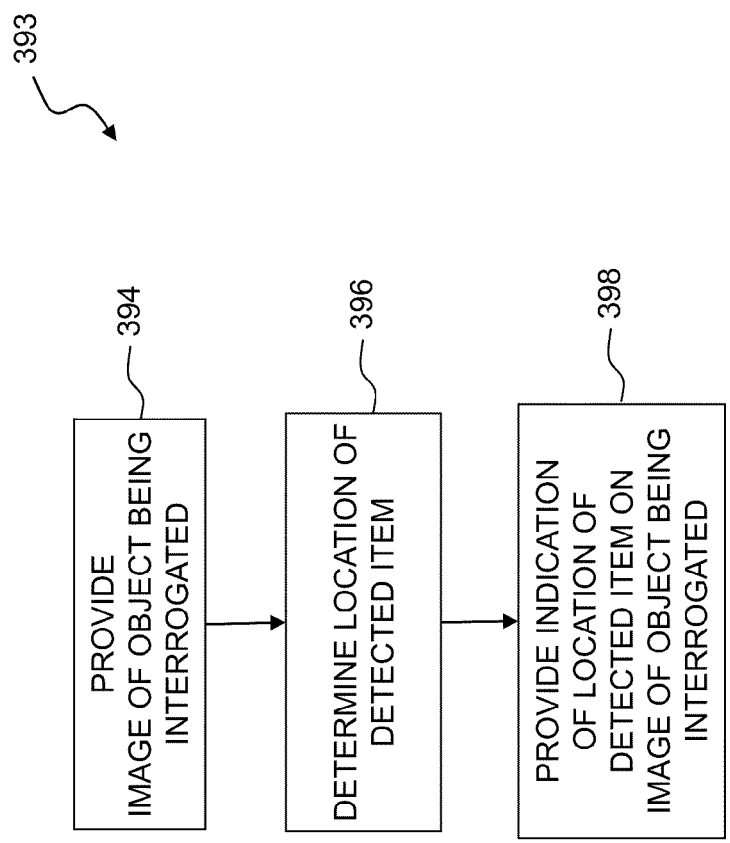
FIG. 18 is a representative processing sequence of the detection software executed by the controller of any of the preceding detection systems.

Referring to FIG. 18, an exemplary processing sequence 393 for when detection is confirmed is shown for an imaging detection system. Detection software 350 provides an image of the object being interrogated, as represented by block 394. In the case of luggage 310 in FIG. 14, monitor 340 displays an image 342 of luggage 310. In one embodiment, the image 342 of luggage 310 is provided by an imaging system receiving the radiation not separated by the tunable bandwidth selector 102, such as imaging system 262 in FIG. 8. Detection software 350 determines a location of the detected item in luggage 310, as represented by block 396. In one embodiment, an imaging system 260 provides an image of luggage 310 in the separated first bandwidth. Detection software 350 then determines which pixels are above the threshold value. These pixels are then flagged as corresponding to the location of the object being detected. Detection software 350 provides an indication of the location of the detected target on the image of luggage 310, as represented by block 398. In one embodiment, detection software 350 superimposes the image provided by imaging system 260 over the image provided by imaging system 262. In situations where in the image provided by imaging system 260 is not in the visible spectrum, a visible spectrum representation of the target is provided as an image for display. The detected object or target 344 is shown by monitor 340. In one embodiment, detection software 350 simply provides a marker or other representation of the target on the image produced by the imaging system 262. In one example, the image produced by imaging system 262 is in the visible spectrum.

In one embodiment, the first bandwidth is selected to provide an image of the contents of the luggage. In one embodiment, the first bandwidth is in the millimeter wavelength range at which non-metallic items are generally transparent. In this manner, an image is formed from the first bandwidth which indicates opaque items at that wavelength, such as metallic items. The image formed by the light passing through tunable bandwidth selector 102 may form a traditional visible light image. Controller, based on the image formed from the first bandwidth may light a location of a metallic item in the visible light image for further investigation. This may be beneficial in the case of scanning human subjects to maintain the privacy of the subject during scanning.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for separating a first bandwidth from an input spectrum including the first bandwidth, the method comprising:
providing a plurality of spaced apart electron sheets;
introducing the input spectrum to the plurality of spaced apart electron sheets such that at least a first portion of the input spectrum transverses the plurality of spaced apart electron sheets; and
adjusting the plurality of spaced apart electron sheets so that the first bandwidth is separated from the input spectrum.

2. The method of claim 1, further comprising the step of altering at least one characteristic of the plurality of spaced apart electron sheets so that a second bandwidth is separated from the input spectrum.

3. The method of claim 1, wherein the step of adjusting the plurality of spaced apart electron sheets so that the first bandwidth is separated from the input spectrum includes the step of adjusting a spacing of at least two of the plurality of electron sheets.

4. The method of claim 1, wherein the step of adjusting the plurality of spaced apart electron sheets so that the first bandwidth is separated from the input spectrum includes the step of adjusting a number of the plurality of electron sheets.

5. The method of claim 1, wherein the step of adjusting the plurality of spaced apart electron sheets so that the first bandwidth is separated from the input spectrum includes the step of adjusting an index of refraction of at least one of the plurality of electron sheets.

6. The method of claim 1, wherein the step of adjusting the plurality of spaced apart electron sheets so that the first bandwidth is separated from the input spectrum includes the step of adjusting an index of refraction of a medium surrounding the plurality of electron sheets.

7. The method of claim 1, further comprising the step of detecting the first bandwidth once separated from the input spectrum.

8. The method of claim 7, wherein the input spectrum travels generally in a first direction and the plurality of spaced apart electron planes cause the separated first bandwidth to travel generally in a second direction normal to the plurality of spaced apart electron sheets and wherein the step of detecting the first bandwidth once separated from the input spectrum includes the step of directing the first bandwidth towards a first detection device.

9. The method of claim 8, wherein the first detection device is an imaging device and the step of detecting the first bandwidth once separated from the input spectrum includes the step of presenting an image of the first bandwidth through imaging optics to the imaging device.

10. A method for selecting a first bandwidth from an input spectrum including the first bandwidth, the method comprising:
   collecting electromagnetic radiation from a detection zone;
   imaging objects within the detection zone based on the collected electromagnetic radiation;
   separating at least a first bandwidth of the collected electromagnetic radiation from the remainder of the collected electromagnetic radiation with a tunable bandwidth selector which reflects the first bandwidth;
   determining a location of a target associated with a first object based on the first bandwidth; and
   imaging a location of the target within the detection zone.

11. The method of claim 10, wherein the step of imaging a location of the target within the detection zone includes the steps of:
   presenting an image of the first object, the image being in the visible spectrum; and
   identifying the location of the target in the image with a marker.

12. The method of claim 10, wherein the step of imaging a location of the target within the detection zone includes the steps of:
   presenting an image of the first object, the image being in the visible spectrum;
   presenting an image of the target, the image of the target being a representation of the target; and
   superimposing the image of the target with the image of the first object.

13. A method for separating a first bandwidth from an input spectrum including the first bandwidth, the method comprising:
   providing a bandwidth selector which including a grating structure having a plurality of movable regions, a spacing between the plurality of movable regions being adjustable to tune the bandwidth selector; and
   using the bandwidth selector to separate the first bandwidth from the input spectrum.

14. The method of claim 13, further comprising the steps of:
   sequentially scanning a plurality items with the bandwidth selector;
   sequentially radiating the plurality of items with electromagnetic radiation.

15. The method of claim 14, wherein the plurality of items are supported on a moveable transport member and the method further comprises the steps of:
   moving the transport member to position a first item into a detection zone of the bandwidth selector;
   radiating the first item with electromagnetic radiation; and
   moving the transport member to position a second item into the detection zone of the bandwidth selector.

16. The method of claim 13, further comprising the step of determining the presence of a first target based on the first bandwidth separated with the bandwidth selector, the first target being one of a chemical, a molecule, an element, a material, and a biological substance.

17. The method of claim 16, further comprising the step of providing an image of a location of the first target.

18. The method of claim 13, wherein the grating structure is a plurality of spaced apart electron sheets.

* * * * *